USo08964422B2

(12) United States Patent
Shi et al.

(10) Patent No.: US 8,964,422 B2
(45) Date of Patent: *Feb. 24, 2015

(54) EMI FREQUENCY SPREADING METHOD FOR SWITCHING POWER CONVERTER

(71) Applicant: iWatt Inc., Campbell, CA (US)

(72) Inventors: Fuqiang Shi, Oak Park, IL (US); Yong Li, San Jose, CA (US); John William Kesterson, Seaside, CA (US); David Nguyen, Santa Clara, CA (US); Junjie Zheng, Santa Clara, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 13/657,593

(22) Filed: Oct. 22, 2012

(65) Prior Publication Data

US 2013/0121049 A1 May 16, 2013

Related U.S. Application Data (60) Provisional application No. 61/560,766, filed on Nov. 16, 2011.

(51) Int. Cl.
*H02M 3/335* (2006.01)
*H02M 1/44* (2007.01)

(52) U.S. Cl.
CPC ............ *H02M 1/44* (2013.01); *H02M 3/33507* (2013.01)
USPC ................... 363/21.16; 363/21.13; 363/21.15

(58) Field of Classification Search
USPC .......... 363/21.01, 21.02, 21.03, 21.12, 21.13, 363/21.15, 21.16, 21.17, 21.18, 131
See application file for complete search history.

(56) References Cited

U.S. PATENT DOCUMENTS

| 5,508,903 A | 4/1996 | Alexndrov |
| 5,612,609 A | 3/1997 | Choi |
| 5,680,034 A | 10/1997 | Redl |
| 5,805,434 A | 9/1998 | Vinciarelli et al. |

(Continued)

FOREIGN PATENT DOCUMENTS

CN 101557171 A 10/2009

OTHER PUBLICATIONS

Kang, S. et al., "On-line Efficiency Optimization in Flyback DC-DC Converters Over Wide Ranges of Operating Conditions," *Twenty-sixth Annual IEEE Applied Power Electronics Conference and Exposition(APEC)*, Mar. 6-11, 2011, pp. 1417-1424, Fort Worth, TX, USA.

(Continued)

*Primary Examiner* — Emily P Pham
(74) *Attorney, Agent, or Firm* — Fenwick & West LLP (57) ABSTRACT

A controller of a switching power converter sets an actual turn-on time of a switch in the switching power converter in each switching cycle by selecting one of a plurality of valley points of the output voltage of the switching power converter occurring subsequent to the desired turn-on time of the switch. The desired turn-on time of the switch may be calculated according to the regulation scheme employed by the switching power converter. The controller selects one of the plurality of valley points randomly from switching cycle to switching cycle. The controller generates a control signal to turn on the switching power converter at the selected one of the plurality of valley points of the output voltage occurring subsequent to the desired turn-on time.

26 Claims, 7 Drawing Sheets

(56) References Cited

U.S. PATENT DOCUMENTS

| | | | |
|---|---|---|---|
| 7,876,085 B2 * | 1/2011 | Hung et al. | 324/102 |
| 7,907,425 B2 * | 3/2011 | Lin | 363/21.05 |
| 8,054,656 B2 * | 11/2011 | Su et al. | 363/21.15 |
| 2002/0085394 A1 | 7/2002 | Giannopoulos et al. | |
| 2008/0123377 A1 | 5/2008 | Lin | |
| 2008/0130324 A1 | 6/2008 | Choi et al. | |
| 2010/0165672 A1 | 7/2010 | Li et al. | |

OTHER PUBLICATIONS

Korean Intellectual Property Office, Office Action, Korean Patent Application No. 10-2012-0129951, Oct. 18, 2013, eight pages.

Chinese First Office Action, Chinese Application No. 201210478596.7, Aug. 11, 2014, 14 pages.

* cited by examiner

EMI FREQUENCY SPREADING METHOD FOR SWITCHING POWER CONVERTER

CROSS REFERENCE TO RELATED APPLICATION

This application claims priority under 35 U.S.C. §119(e) from U.S. Provisional Patent Application No. 61/560,766, filed on Nov. 16, 2011, which is incorporated by reference herein in its entirety.

BACKGROUND

1. Technical Field

The present disclosure relates to improving electromagnetic interference frequency in a switching power converter operating in a valley-mode switching (VMS) scheme.

2. Description of the Related Art

Each time a switch, such as a transistor, in a switching power converter is turned on or off, electromagnetic interference (EMI) related to the switching frequency is generated. Large rates of change for voltages and/or currents (i.e., dv/dt and/or di/dt) at the time of the switch transition increase the amount of EMI produced by the switch. EMI generated by switching power converters, if not properly managed, can generate frequencies that actively interfere with the operation of other devices coupled to the switching power converters, or can otherwise encroach into frequency bands designated to be free from interfering frequencies.

SUMMARY

Embodiments include setting an actual turn-on time of a switch in a switching power converter in each switching cycle by selecting one of a plurality of valley points of the output voltage occurring subsequent to the desired turn-on time of the switch calculated according to the regulation scheme employed by the switching power converter, with the selection of one of the plurality of valley points done randomly from switching cycle to switching cycle. In one embodiment, the switching power converter may be turned on at either one of two valley points of the output voltage occurring subsequent to the desired turn-on time of the switch calculated according to the regulation scheme employed by the switching power converter, with the selection of one of two valley points occurring according to the value of a pseudo random number sequence. Turning on the switch at one of multiple valley points randomly selected results in spreading the frequency spectrum of EMI generated by the switching activities in the switching power converter, reducing the EMI energy in any one particular band. Furthermore, the VMS scheme according to the embodiments herein better isolates other devices coupled to the switching power converter from switching-induced EMI by limiting the variation of the instantaneous switching frequency.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1:
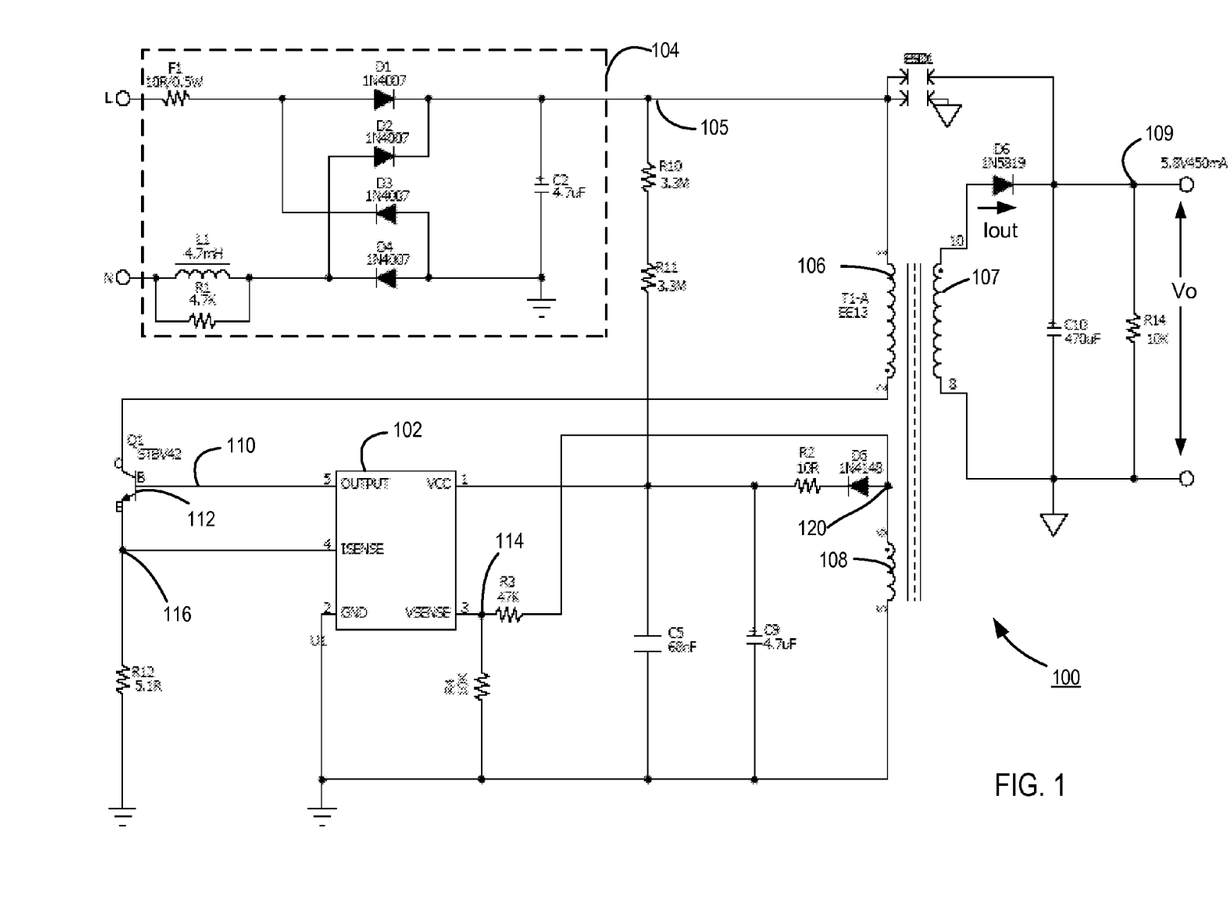
FIG. 1 illustrates an AC to DC flyback switching power supply, according to one embodiment.

FIG. 1 illustrates an exemplary power converter 100 in accordance with one embodiment. As illustrated, the power converter 100 is an AC to DC flyback switch-mode power supply, but other topologies of switch-mode power converters can be designed in accordance with the approach to improve the effective spread of EMI generated by a switching power converter operating in a VMS scheme and other teachings described herein. The power converter 100 includes three principal sections, i.e., a front end 104, a power stage, and a secondary stage.

The front end 104 is directly connected to an AC voltage source (not shown) at nodes L, N, and includes a bridge rectifier comprised of inductor L1, resistors R1, F1, diodes D1, D2, D3, D4, and capacitor C2. The output of the front end section 104 at node 105 is a rectified but unregulated DC input voltage. The rectified input line voltage at node 105 is input to the supply voltage pin Vcc (pin 1) of switch controller 102 via resistors R10 and R11 for use as the supply voltage during initial start-up of controller 102. The line voltage at node 105 is also applied to the primary winding 106 of power transformer T1-A. Bypass capacitor C5 removes high frequency noise from the rectified line voltage at node 105.

The power stage comprises power transformer T1-A, a switch 112, and a controller 102. Power transformer T1-A includes a primary winding 106, a secondary winding 107, and an auxiliary winding 108. Controller 102 maintains output regulation via control of the ON and OFF states of switch 112 via a control signal 110 output from the OUTPUT pin (pin 5) of controller 102. In one embodiment, controller 102 is an application-specific integrated circuit (ASIC) and generates the control signal 110 in accordance with the improved VMS scheme and techniques described herein.

Control signal 110 drives the control terminal of switch 112. In the embodiment illustrated by FIG. 1, switch 112 is a bipolar junction transistor (BJT), so the control terminal is the base (B) terminal of switch 112. Meanwhile, the collector (C) of switch 112 is connected in series with the primary winding 106, while the emitter (E) of switch 112 is connected to the ISENSE pin (pin 4) of controller 102 and to ground via resistor R12. In other embodiments, switch 112 can be another type of transistor such as a MOSFET or any other device capable of opening or closing a circuit in a controlled manner. The ISENSE pin (pin 4) senses the current through the primary winding 106 and switch 112 in the form of a voltage across sense resistor R12. The GND pin (pin 2) of controller 102 is connected to ground. Controller 102 can employ any one of a number of well known modulation techniques, such as pulse-width-modulation (PWM) or pulse-frequency-modulation (PFM), and/or their combinations, to control the ON and OFF states and duty cycles of BJT power switch 110, as well as the amplitude of the base current of BJT switch 112.

The secondary stage of the converter 100 includes the secondary winding 107 and diode D6, capacitor C10, and resistor R14. Diode D6 functions as an output rectifier and capacitor C10 functions as an output filter. The resulting regulated output voltage Vo at node 109 is delivered to the load (not shown). Resistor R14 is the so-called pre-load which is typically used for stabilizing the output at no load conditions. Also, ESD discharge gap (ESD1) is coupled between the primary winding 106 and output node 109.

As shown by FIG. 1, the output voltage V0 across the secondary winding 107 is reflected by the voltage 120 across auxiliary winding 108, which is input to the VSENSE pin (pin 3) of controller IC 102 via a resistive voltage divider comprised of resistors R3 and R4. In one embodiment, the voltage 114 at the VSENSE pin (pin 3) provides feedback to the controller 102 for use in controlling the operation of switch 112 and the output voltage 109 for regulation of output voltage (Vo) or output current (Iout). Also, although controller 102 is powered up by the line voltage 105 at start-up, after start-up and in normal operation, controller 102 is powered up by the voltage across auxiliary winding 108 and the line voltage 105 is not used for regulation of output voltage (Vo) and input voltage (Vin) in normal operation. Diode D5 and resistor R2 form a rectifier for rectifying the voltage 120 across auxiliary winding 108 for use as the supply voltage input to the VCC pin (pin 1) of controller 102 during normal operation of the switching power converter 100. Capacitor C9 is used to hold power from the line voltage at node 105 at start-up or from the voltage across auxiliary winding 108 during start-up and between switching cycles of the switching power converter 100.

Figure 2A:
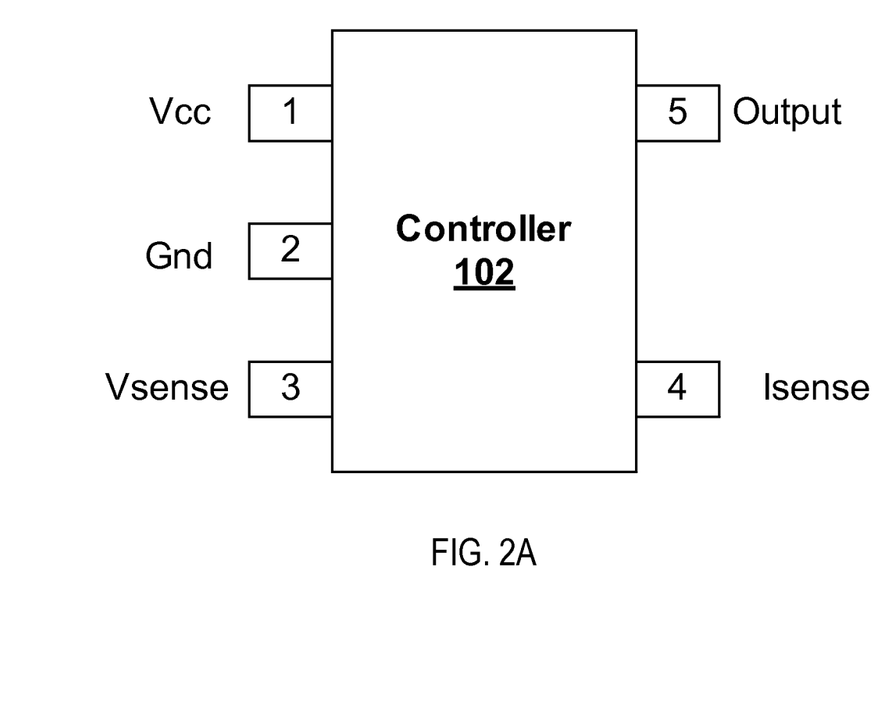
FIG. 2A illustrates the pin-outs of the controller IC of the AC to DC flyback switching power supply, according to one embodiment.

FIG. 2A illustrates the pin-outs of the controller IC 102 according to one embodiment. Controller 102 is a 5-pin IC. Pin 1 (Vcc) is a power input pin for receiving the supply voltage, pin 2 (GND) is a ground pin, pin 3 ($V_{SENSE}$) is an analog input pin configured to receive the voltage 120 across the auxiliary winding 108 of the flyback switching power supply for primary-side regulation of the output voltage 109, pin 4 ($I_{SENSE}$) is an analog input pin configured to sense the primary-side current of the flyback switching power supply in the form of an analog voltage, for cycle-by-cycle peak current control and limit. Pin 5 (OUTPUT) is an output pin outputting base drive signal 110 for controlling the on-times and off-times of the BJT power switch 112 as well as the amplitude of the base current of BJT power switch 112.

Figure 2B:
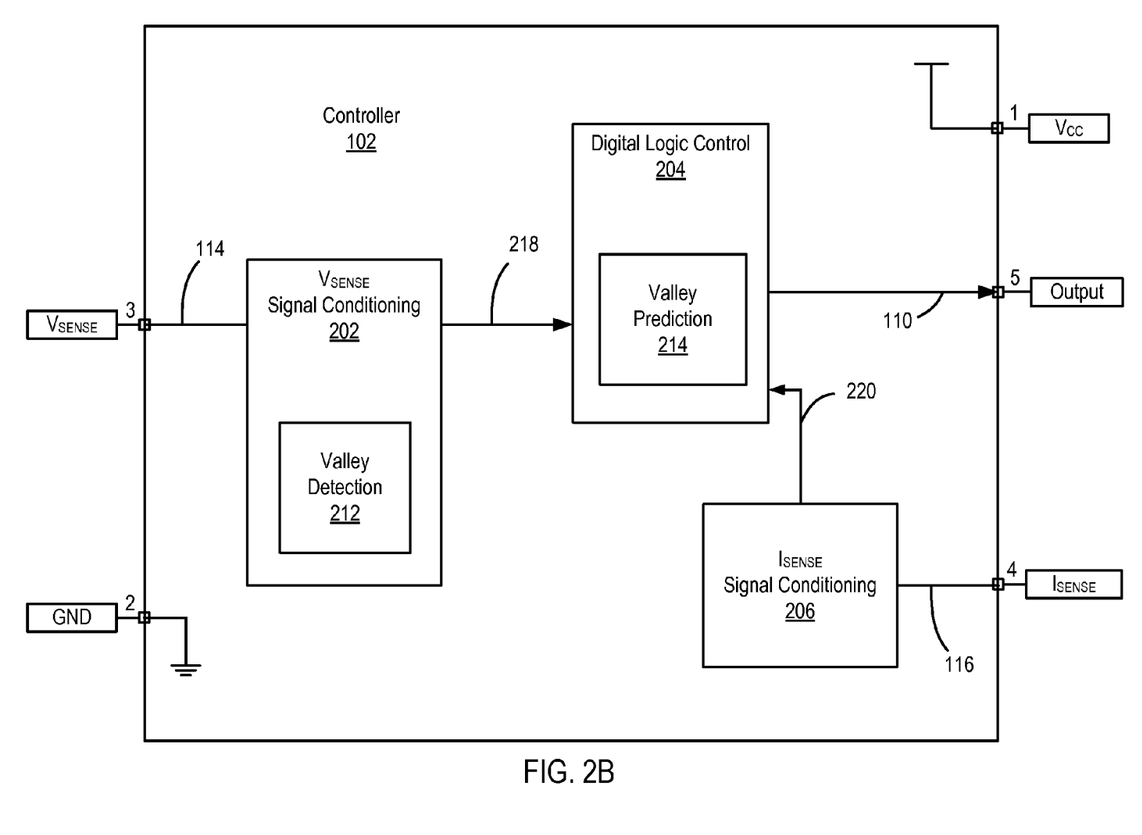
FIG. 2B illustrates the internal circuitry of the controller IC of the AC to DC flyback switching power supply in more detail, according to one embodiment.

FIG. 2B illustrates the internal circuitry of the controller 102, according to one embodiment. Controller 102 includes several main circuit blocks, including a $V_{SENSE}$ signal conditioning block 202, an $I_{SENSE}$ signal conditioning block 206, and a digital logic control block 204. Controller 102 receives analog signals such as $V_{SENSE}$ 114 at pin 3 and the $I_{SENSE}$ voltage 116 at pin 4, but adaptively processes these parameters using digital circuitry and digital state machines to generate the appropriate control signal 110 at pin 5 (Output) for regulation of the output voltage (Vo) and output current (Iout) under the adopted operation mode of the switching power converter 100.

$V_{SENSE}$ signal conditioning block 202 receives $V_{SENSE}$ 114 as an analog voltage signal and generates one or more voltage feedback signals 218 that reflect the output voltage (Vo) at node 109. The $V_{SENSE}$ signal conditioning block 202 includes a valley detection module 212 that detects resonant characteristics of $V_{SENSE}$ 114 and outputs related valley feedback signals, as will be explained in more detail below with reference to FIG. 4. Included in the voltage feedback signals 218 are the valley feedback signals output to the valley prediction module 214.

$I_{SENSE}$ signal conditioning block 206 receives the $I_{SENSE}$ voltage 116 as an analog voltage signal and generates one or more current feedback signals 220 that reflect the primary side current flowing through switch 112. Sensing the $V_{SENSE}$ 114 voltage allows for precise output voltage regulation, and sensing the $I_{SENSE}$ voltage 116 allows for precise cycle-by-cycle peak current control and limiting in both constant voltage and constant current modes as well as precise constant current (output current Iout) control that is insensitive to the magnetizing inductance Lm of the transformer T1-A.

Digital logic control block 204 processes the voltage feedback signals 218 and the current feedback signals 220 and implements an improved VMS scheme to generate the control signal 110 that governs the operation and on/off states of the switch 112 for regulation of output voltage (Vo) and output current (Iout). Digital logic control block 204 includes a valley prediction module 214 that predicts the location of local valleys for $V_{SENSE}$ 114 based on resonance information included in the voltage feedback signals and introduces dither in selecting which one of the local valleys to use as the timing for turning on the switch 112 in each switching cycle of the switching power converter 100, as detailed below with reference to FIGS. 3A, 3B, 4, and 5. Also, digital logic control block 204 includes a digital state machine (not shown) for implementing one or more control schemes for regulating the operation of the power converter 100 based on the voltage feedback signals 218 and the current feedback signals 220. Digital logic control block 204 can implement any number of control schemes suitable for switch-mode power converters 100, such as pulse-width-modulation (PWM) or pulse-frequency-modulation (PFM), and/or their combinations.

Under an example PWM control scheme, digital logic control block 204 turns on the switch 112 with a constant switching frequency, and therefore a constant switching period, but varies the duty cycle of the switch by adjusting how long the switch 112 remains ON during each switching period. Duty cycle refers to the fraction (often expressed as a percentage) of the switching period during which the switch 112 is ON. For example, a PWM switching scheme may have a switching frequency of 100 kHz and therefore a switching period of 10 µs. Hence, for a duty cycle of 30%, switch 112 would be ON for 3 μs and OFF for 7 μs of each switching period. Under PWM control, digital logic control block 204 regulates the output voltage (Vo) at node 109 based on feedback signals such as the voltages received by either the $V_{SENSE}$ pin (pin 3) or $I_{SENSE}$ pin (pin 4) by adjusting the duty cycle of control signal 110, but maintains a constant switching frequency for control signal 110.

Under an example PFM control scheme, digital logic control block 204 turns on the switch 112 with pulses of a set duration, but controls the duty cycle of control signal 110 by issuing the pulses with a variable switching frequency, and therefore a variable switching period. For example, a PFM switching scheme may turn on the switch 112 for 5 μs of each switching period, but vary the switching frequency between 40 kHz and 130 kHz. A switching frequency of 40 kHz would correspond to a switching period of 25 μs and therefore a duty cycle of 20%, whereas a switching frequency of 130 kHz would correspond to a switching period of 7.7 μs and therefore a duty cycle of approximately 65%. Hence, under PFM control, digital logic control block 204 regulates the output voltage (Vo) at node 109 based on feedback signals such as the voltages received by either the $V_{SENSE}$ pin (pin 3) or $I_{SENSE}$ pin (pin 4) by adjusting the frequency and period of control signal 110, but the switch 112 is ON for the same duration during each switching period.

The example PWM and PFM control schemes described above are presented for illustrative purposes. The VMS scheme and associated techniques described herein can benefit a switch-mode power converter 100 that uses any control scheme, regardless of whether PWM or PFM or some other control scheme is used. For example, the VMS scheme enables the power converter 100 to take advantage of resonance within the power converter 100 to operate switch 112 when the voltage across switch 112 is at a minimum.

Figure 3A:
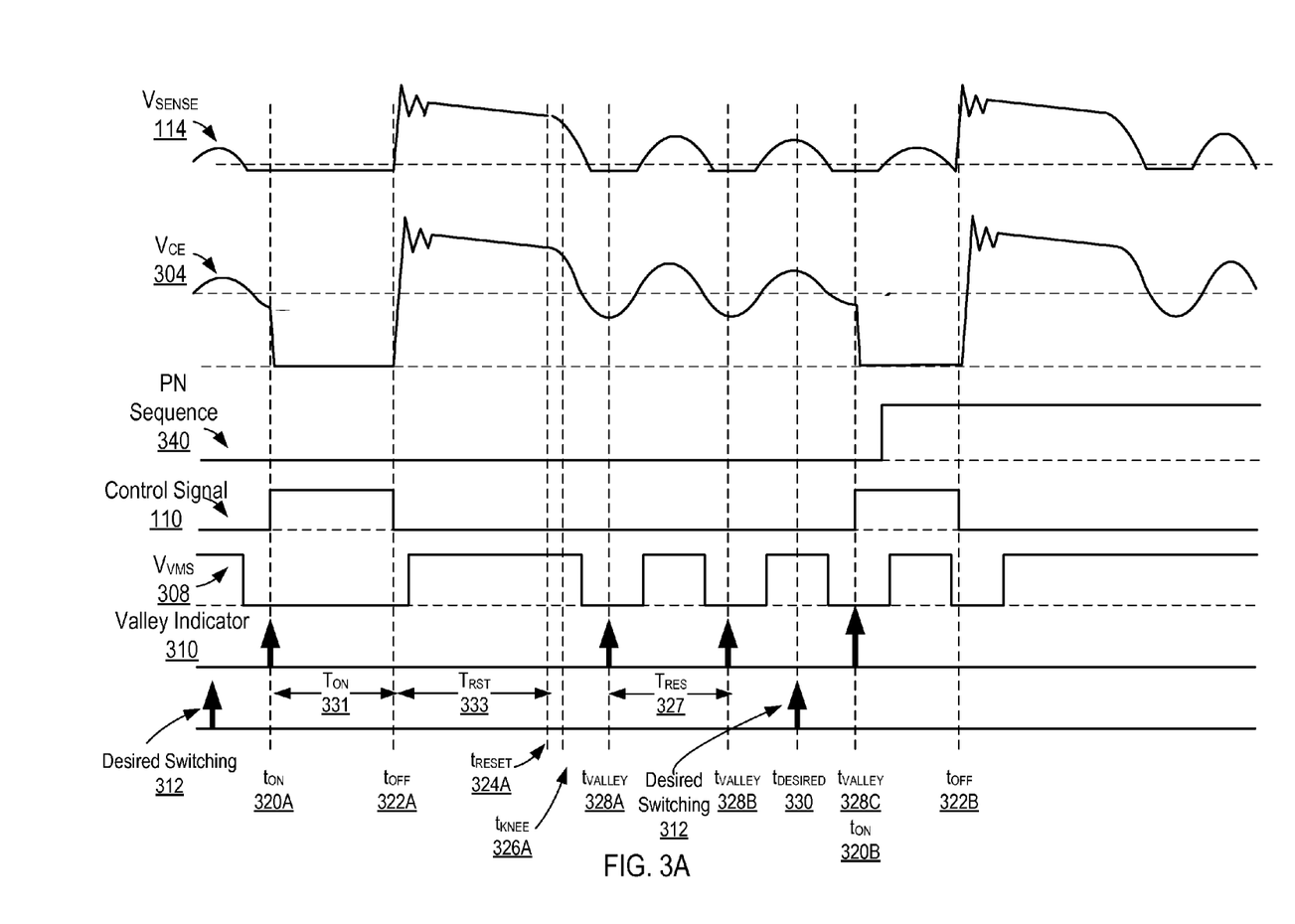
FIG. 3A illustrates operational waveforms for the flyback switching power supply of FIG. 1 during a switching cycle, according to one embodiment.
Figure 3B:
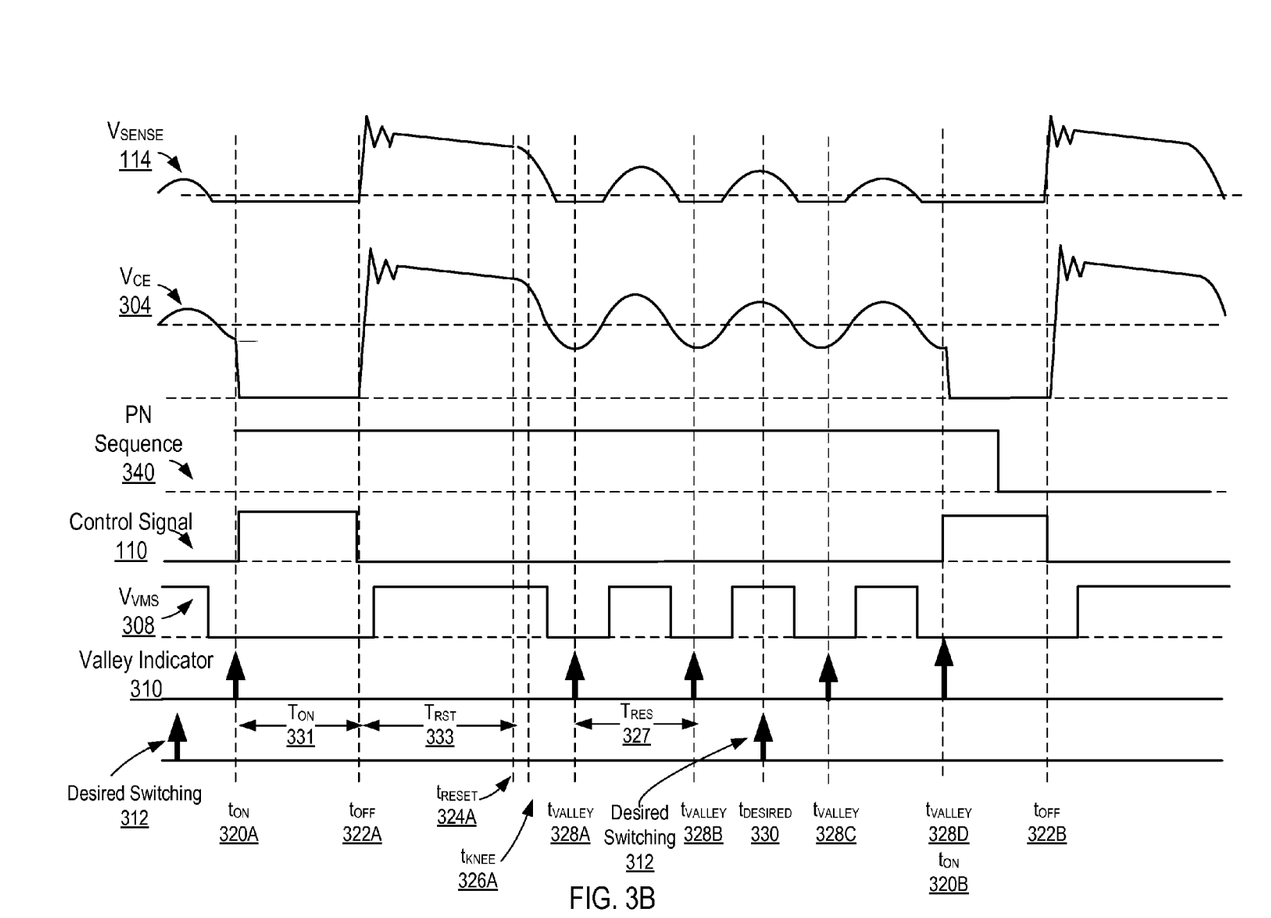
FIG. 3B illustrates operational waveforms for the flyback switching power supply of FIG. 1 during another switching cycle, according to one embodiment.

FIG. 3A illustrates operational waveforms for the flyback switching power supply of FIG. 1 during a switching cycle, and FIG. 3B illustrates operational waveforms for the flyback switching power supply of FIG. 1 during another switching cycle, according to one embodiment. FIGS. 3A and 3B are similar except that FIG. 3A illustrates that valley point 328C is selected as the switch turn-on time $t_{ON}$ 320B according to the PN sequence 340 in one switching cycle, while FIG. 3B illustrates that valley point 328D is selected as the switch turn-on time $t_{ON}$ 320B according to PN sequence 340 in another switching cycle different from the switching cycle shown in FIG. 3A. The switching cycle in FIG. 3B may be immediately subsequent to, subsequent to by multiple cycles, or even prior to, the switching cycle shown in FIG. 3A.

As described above, $V_{SENSE}$ 114 represents the voltage on the $V_{SENSE}$ pin (pin 3) of switch controller 102. $V_{CE}$ 304 represents the voltage across switch 112. Hence, in the embodiment illustrated by FIG. 1 wherein the switch 112 is a BJT, $V_{CE}$ 304 is the voltage between the collector and the emitter of BJT switch 112. In other embodiments (not shown), switch 112 can be a power MOSFET, in which case $V_{CE}$ 304 would correspond to the voltage between the source and the drain of the MOSFET. As can be seen from the schematic of FIG. 1, $V_{SENSE}$ 114 is substantially proportional to the voltage 120 across the auxiliary winding of the transformer. $V_{SENSE}$ 114 and $V_{CE}$ 304 exhibit nearly identical timing characteristics. As described above, control signal 110 represents the voltage on the OUTPUT pin (pin 5) of switch controller 102. The switch 112 is ON (closed) when control signal 110 is HIGH and the switch 112 is OFF (open) when control signal 110 is LOW. $V_{VMS}$ 308, valley indicator pulses 310, and desired switch pulses 312 are timing signals internal to controller 102 whose generation and significance are detailed below in reference to FIGS. 3A and 3B.

Figure 4:
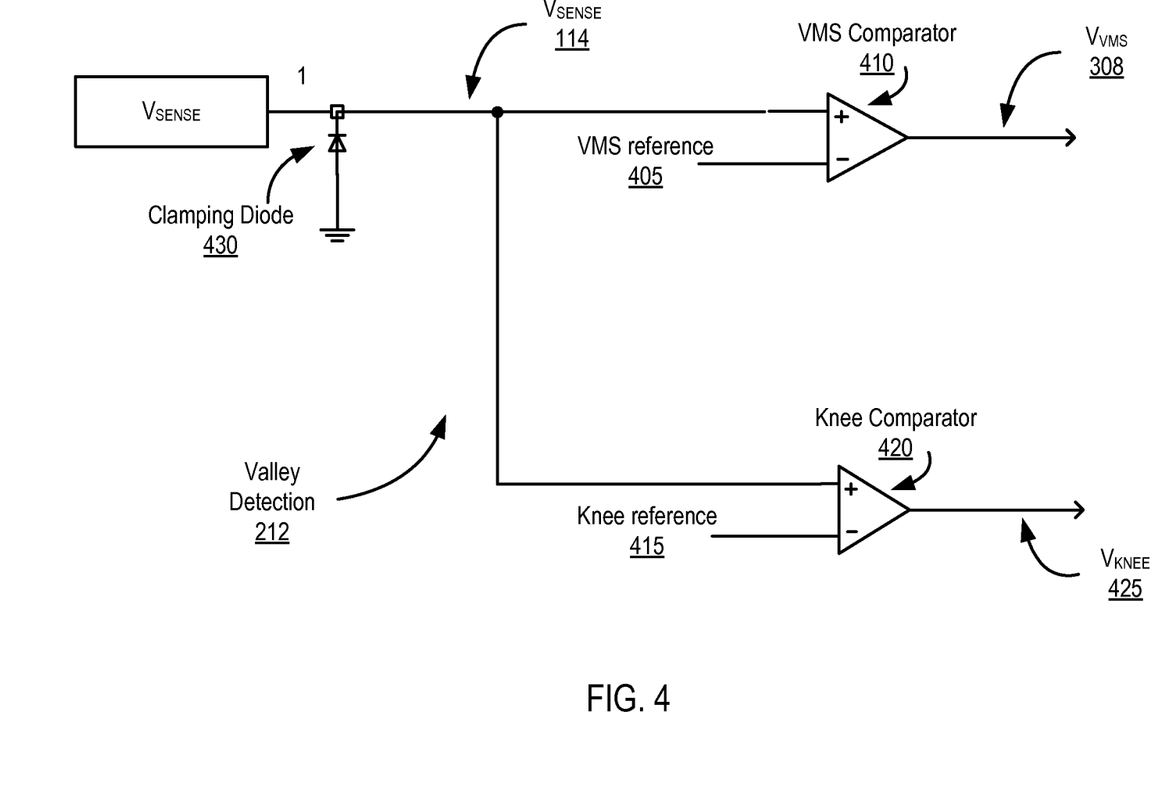
FIG. 4 illustrates a circuit for detecting and predicting the timing of valleys for a switch voltage, according to one embodiment.

At time $t_{ON}$ 320A, controller 102 generates control signal 110 to be HIGH, turning on (closing) switch 112. Switch 112 remains closed until time $t_{OFF}$ 322A, when control signal 110 becomes LOW pursuant to the operation of controller 102. As explained above, the particular timings of $t_{ON}$ 320A and $t_{OFF}$ 322A are determined by the particular control scheme (PWM or PFM) employed in switching power converter 100. While switch 112 is closed from time $t_{ON}$ 320A to time $t_{OFF}$ 322A, referred to herein as the ON-time (or ON-period) $T_{ON}$ 331, the rectified DC input voltage $V_{IN}$ 105 is applied to the primary winding 106 and the current through the primary winding 106 increases. During the ON-time $T_{ON}$ 331, the voltage across the auxiliary winding 108 is characterized by the mathematical expression $$V_X = -\frac{N_X}{N_1} V_{IN},$$

wherein $N_X$ is the number of turns for the auxiliary winding 108, $N_1$ is the number of turns for the primary winding 106, $V_{IN}$ is the rectified DC input voltage at node 105, and $V_X$ is the voltage at node 120 across the auxiliary winding 108. Although the voltage 120 across the auxiliary winding 108 is negative during $T_{ON}$ 331, $V_{SENSE}$ 114 does not significantly decrease below zero because of the clamping diode 430 included in controller 102. As shown in FIG. 4, the anode of the clamping diode 430 is connected to GND while the cathode of the clamping diode 430 is connected to the $V_{SENSE}$ pin (pin 3). Hence, $V_{SENSE}$ does not drop below zero during $T_{ON}$ 331 by more than the forward voltage drop of the clamping diode 430. $V_{CE}$ 304 is also close to zero throughout $T_{ON}$ 331.

However, referring back to FIG. 3A, at time $t_{OFF}$ 322A, control signal 110 goes LOW, causing switch 112 to open and suddenly interrupting the current through the primary winding 106. The current through the primary winding 106 stays at zero until the end of the OFF period of switch 112, i.e., until the switch 112 is turned on again at time $t_{ON}$ 320B as will be explained in more detail below. As shown by FIG. 3A, this sudden change in current results in high-frequency parasitic ringing for both $V_{SENSE}$ 114 and $V_{CE}$ 304 immediately following time $t_{OFF}$ 322A. The high-frequency parasitic ringing results from resonance between the transformer leakage inductance and the parasitic capacitance seen from the collector and emitter of BJT switch 112 in parallel with the equivalent parallel parasitic capacitance of the primary winding 106, and typically dies out quickly. After the high-frequency parasitic ringing dies out, $V_{SENSE}$ 114 and $V_{CE}$ 304 remain almost flat until the transformer resets, shown in FIG. 3A as time $t_{RESET}$ 324A.

The duration between $t_{OFF}$ 322A and $t_{RESET}$ 324A is referred to herein as the transformer reset period ($T_{RST}$) 333. During the transformer reset period $T_{RST}$ 333, diode D6 conducts and the voltage across the secondary winding 107 approximately equals the output voltage 109 ($V_O$) (the forward voltage drop across diode D6 can be considered negligible for the purpose of illustrative clarity). Accordingly, the voltage across the primary winding 106 ($V_1$) can be expressed in terms of the output voltage 109 ($V_O$) as $$V_1 = \frac{N_1}{N_2} V_O$$

and the voltage across the auxiliary winding 108 ($V_X$) can be expressed as $$V_X = +\frac{N_X}{N_2} V_O$$

wherein $N_1$, $N_2$, and $N_X$ are the number of turns for the primary winding 106, secondary winding 107, and auxiliary winding 108, respectively. During the transformer reset time $T_{RST}$ 333, $V_{SENSE}$ 114 follows the voltage across the auxiliary winding 108 according to the scaling factor set by the voltage divider comprised of resistors R3 and R4. Meanwhile, $V_{CE}$ 304 is given by the expression $$V_{CE} = \frac{N_1}{N_2} V_O + V_{IN},$$

wherein $V_{IN}$ is again the rectified DC input voltage at node 105.

The transformer reset time $T_{RST}$ 333 is dictated by the volt-second-balance requirement for resetting the transformer core and can vary between switching cycles based on fluctuations in load and other quantities within the power converter 100. At $t_{RESET}$ 324A (the end of the transformer reset time $T_{RST}$ 333), diode D6 stops conducting, causing the transformer magnetizing inductance and therefore $V_{SENSE}$ 114 and $V_{CE}$ 304 to resonate, a phenomenon referred to herein as transformer ringing. The resonant frequency ($f_{RES}$) and resonant period ($T_{RES}$) 327 of ringing for $V_{SENSE}$ 114 and $V_{CE}$ 304 due to transformer ringing is determined by the parasitic capacitance seen from the collector and the emitter of BJT switch 112 in parallel with the equivalent parallel parasitic capacitance of the primary winding 106. Due to various damping and loss factors within the power converter 100, $V_{SENSE}$ 114 and $V_{CE}$ 304 are decaying sinusoidal signals with resonant period $T_{RES}$ 327.

As shown by FIG. 3A, the ringing-induced voltage oscillations cause $V_{SENSE}$ 114 and $V_{CE}$ 304 to periodically approach or reach local minimum voltages and local maximum voltages. When the OFF time for switch 112 is long relative to the resonant period $T_{RES}$ 327, eventually the transformer ringing decays completely and $V_{CE}$ 304 settles at $V_{IN}$ 105. Times at which $V_{CE}$ 304 reaches a local minimum as a result of transformer ringing are referred to herein as valleys 328A, 328B, and 328C. For example, FIG. 3A illustrates a first valley 328A, a second valley 328B, and a third valley 328C. Although three valleys are shown in FIG. 3B, there can be more or less than three valleys before the switch is turned ON again at $t_{ON}$ 320B.

As described previously, some VMS schemes would turn on switch 112 (i.e., set control signal 110 HIGH) at the first valley 328A, which is prior to the desired switching timing 312. Turning on switch 112 during a valley reduces the magnitude of the switching transition, which in turn may reduce the magnitude of EMI generated related to the switching frequency. Using the durations shown in FIG. 3, this type of VMS schemes would result in a switching period of approximately ($T_{ON}+T_{RST}+T_{RES}/2$). And as described previously, fluctuations in the transformer reset time $T_{RST}$ 333 as well as the ON-time $T_{ON}$ 331 would precipitate changes in the switching frequency of the power converter 100.

The resulting fluctuations in switching frequency make it difficult to prevent the switching frequency from encroaching on frequency bands intended to be free from interference. The variation in switching frequency results in the generation of varying spectrums of EMI emissions corresponding to the switching frequencies. And in some cases one or more of the varying spectrums of EMI emissions will encroach into an unintended frequency band. Accordingly, while this type of VMS scheme may reduce the magnitude of EMI emissions associated with a given switching frequency, it lacks the ability to manage the spectral spread of EMI emissions in a predictable manner.

In contrast, the VMS scheme implemented by controller 102 according the embodiments herein does not necessarily turn on switch 112 (i.e., set control signal 110 HIGH) at the first valley 328A. Rather, controller 102 can dither the point to turn on the switch 112 on a switching cycle-by-switching cycle basis between valleys that occur subsequent to a desired switch time ($t_{DESIRED}$) calculated according to the output voltage regulation scheme employed by the digital logic controller 204 of the switching power converter 100. As described herein, dither refers to modulation of the time distribution of the selection of each valley point at which the switch is turned on. This turn-on time (shown in FIG. 3 as $t_{ON}$ 320B) is determined according to the control scheme employed by power converter 100 (e.g., a PWM, PFM or other suitable control scheme) combined with dithering of the valley point to use as will be explained further below. For example, for each switching cycle, controller 102 may determine the actual switching period of switch 112 according to the following algorithm: Tp_final=Tp_calc+T_dly, where Tp_final represents the final switching period, Tp_calc represents the calculated switching period based on the regulation control algorithm, and T_dly represents the additional delay added to the switching period by the combination of VMS and dithering of the valley point.

Specifically, digital logic control block 204 determines a desired switch time $t_{DESIRED}$ 330 in accordance with PWM, PFM, or other control schemes suitable for power converter 100. Digital logic control block 204 determines the desired switch time $t_{DESIRED}$ 330 independently of the resonant characteristics of power converter 100. Hence, resonant characteristics of the power converter 100 such as the transformer reset period $T_{RST}$ 333 or the resonant period $T_{RES}$ 327 do not constrain the control scheme implemented by digital logic control block 204 or influence determination of the desired switch time $t_{DESIRED}$ 330.

Digital control block 204 then detects the valleys of the output voltage that occur subsequent to desired switch time $t_{DESIRED}$ 330 as further described in reference to FIG. 4 and selects one of the plurality of valley points among a set of valley points that occur subsequent to $t_{DESIRED}$ 330 to actually turn on the switch. To more effectively spread EMI emissions, controller 102 may use a pseudo-random number (PN) sequence 340 to dither the selection of which of the set plurality of valley points subsequent to $t_{DESIRED}$ 330 to use as the actual turn-on timing of the switch 112. In one example, the set of valley points may be a set of adjacent valley points (e.g., first-second or second-third valley points that occur after $t_{DESIRED}$ 330). In another example, the set of valley points may be a set of non-adjacent valley points (e.g., second-fourth or first-fourth that occur after $t_{DESIRED}$ 330). Generally, the set of valley points from which a valley point is selected to use as the actual turn-on time of the switch 112 includes any set of valley points that occur within a switching cycle subsequent to desired switch time $t_{DESIRED}$ 330 resulting in instantaneous frequency variation between subsequent switching cycles of at least one valley. In other words, the number of valley points included in the set of valley points is selected in a manner to minimize the creation of large instantaneous frequency range deviation between subsequent switching cycles, while also reducing EMI.

For example, controller 102 may select either the first valley point or the second valley point immediately following desired switch time $t_{DESIRED}$ 330 as the actual turn-on time $t_{ON}$ 320A of switch 112, according to the result of a pseudo-random sequence. Specifically, controller 102 may assign a pseudo-random value to the first valley point and another pseudo-random value to the second-valley point. Controller 112 then determines the value of the pseudo-random number sequence at the desired switch turn-on time $t_{DESIRED}$ 330, and selects a valley switching point corresponding to the determined pseudo-random value in PN sequence 340. For example, as shown in FIG. 3A, PN sequence 340 may be a 1-bit binary number, "0" or "1". The PN sequence may be generated by any type of pseudo-number generator (not shown herein), which generates a pseudo-random number for each switching cycle. The PN sequence generator may be included in controller 102.

In this example, at the desired switch time $t_{DESIRED}$ 330, PN sequence is "0", which corresponds to first valley 328C. Hence, controller 112 sets control signal 110 HIGH to turn on switch 112 at the first valley 328C appearing subsequent to $t_{DESIRED}$ 330. On the other hand as shown in FIG. 3B, at the desired switch time $t_{DESIRED}$ 330, PN sequence is "1", which corresponds to the second valley point 328D immediately subsequent to the first valley point 328C. Hence, controller 112 sets control signal 110 HIGH at the valley 328D to turn on the switch 112. In other embodiments, PN sequence may be a multi-bit value greater than one bit, which enables controller 112 to switch between greater than two adjacent or non-adjacent valley points that occur subsequent to desired switch time $t_{DESIRED}$ 330. For example, controller 112 may cause $t_{ON}$ 320B to dither between the second and third valley points occurring subsequent to calculated $t_{DESIRED}$ 330 according to a 1-bit PN sequence. For another example, controller 112 may cause $t_{ON}$ 320B to dither between the first, second, third, and fourth valley points occurring subsequent to calculated $t_{DESIRED}$ 330 according to a 2-bit PN sequence. For another example, controller 112 may cause $t_{ON}$ 320B to dither between the first and third valley points occurring subsequent to calculated $t_{DESIRED}$ 330 according to a 1-bit PN sequence.

Hence, one embodiment of the improved VMS scheme according to the embodiments herein advantageously turns on switch 112 while $V_{CE}$ 304 is at a local minimum (i.e., a valley 328A, 328B . . . 328D) without restricting the control scheme or switching frequency utilized by controller 102. In other words, controller 102 determines the appropriate desired switch time 330 based on the employed control scheme independent of the resonant characteristics of the power converter 100, and then randomly dithers, from switching cycle-to-switching cycle, the actual turn-on time of switch 112 between at least two valleys following the desired switch time $t_{DESIRED}$ 330. Thus, the control scheme described herein may also be referred to as a "valley hopping switching" scheme. By dithering the turn-on time of switch 112 between multiple valley points subsequent to the calculated desired switch time $t_{DESIRED}$ 330, it is possible to effectively spread EMI related to the switching frequency and limit the variation of the instantaneous switching frequency while still reaping the benefits of valley mode switching.

As shown by FIGS. 3A and 3B, there is a timing delay between the desired switch pulse 312 generated by the digital logic control block 204 at timing $t_{DESIRED}$ 330 and the turn on timing $t_{ON}$ 320B of switch 112 (i.e., control signal 110 going HIGH) at valley 328C (FIG. 3A) or 328D (FIG. 3B). However, the timing delay does not adversely affect operation of the power converter 100. Resonant periods $T_{RES}$ 327 are typically brief relative to the switching period of the switching power converter, so the delay between the desired switch pulse 312 and actual turn-on time $t_{ON}$ 320B is usually not significant. Furthermore, the small impact of the timing delay is reflected in the output voltage 109 and other converter 100 parameters, and therefore the PWM, PFM, or other feedback-based control schemes implemented by controller 102 naturally compensates for the timing delay when determining the on-times and off-times for the subsequent switching period. Additionally, the fluctuations in timing delay from one switching cycle to the next switching cycle introduce dithering to the switching frequency over time, beneficially reducing switch-produced EMI by more effectively spreading the EMI spectrum. Because the variation in switching frequency is limited to adjacent valley points, the valley hopping scheme according to embodiments herein improves management of the amount of EMI that may potentially interfere with frequency bands intended to be free from such interference.

FIG. 4 depicts a valley detection circuit 212 in accordance with one embodiment. As explained above, the valley detection circuit 212 may be present in controller 102, specifically in the $V_{SENSE}$ signal conditioning circuit 202. The valley detection circuit 212 detects features of signals within the power converter 100 such as $V_{SENSE}$ 114 and $V_{CE}$ 304. A detected feature can comprise, for example, the timing of a rising edge or falling edge of such signals, or such signals crossing a particular voltage threshold. The features detected by valley detection circuit 212 are processed by valley prediction module 214 in digital logic control block 204 to predict the locations of valleys 328A, 328B . . . 328D, enabling the improved VMS scheme according to the embodiments described herein. The valley detection circuit 212 includes a VMS comparator 410, a knee comparator 420, and the previously described clamping diode 430.

VMS comparator 410 receives $V_{SENSE}$ 114 at its positive input and compares it to a VMS reference voltage 405 received at the negative input of VMS comparator 410. VMS comparator 410 outputs the $V_{VMS}$ signal 308. Hence, as illustrated by the waveforms of FIGS. 3A and 3B, the $V_{VMS}$ signal 308 is HIGH whenever $V_{SENSE}$ 114 is above VMS reference 405 and is LOW whenever $V_{SENSE}$ 114 is below VMS reference 405. VMS reference 405 can vary between different power converter 100 embodiments, but is a voltage close to zero, i.e., sufficiently low to accurately indicate that $V_{SENSE}$ 114 has dropped to a voltage low enough that a falling edge of $V_{VMS}$ 308 can be used to predict a valley 328A, 328B . . . 328D, as illustrated by FIGS. 3A and 3B. For example, VMS reference 405 is 0.115V in one embodiment.

Knee comparator 420 receives $V_{SENSE}$ 114 at its positive input and compares it to a knee reference voltage 415 received at the negative input of knee comparator 420. Knee comparator 420 outputs the $V_{KNEE}$ signal 425 (not shown in FIGS. 3A and 3B), which is HIGH whenever $V_{SENSE}$ 114 is above the knee reference voltage 415 and is LOW whenever $V_{SENSE}$ 114 is below the knee reference voltage 415. Hence, for example, a falling edge for $V_{KNEE}$ 425 may occur at $t_{KNEE}$ 326 (illustrated in FIGS. 3A and 3B) which corresponds to a knee for $V_{SENSE}$ 114 (and therefore $V_{CE}$ 304) as it decays. The specific level of the knee reference voltage 415 can vary between different power converter 100 embodiments, but is chosen to correspond to a knee voltage for $V_{SENSE}$ and is set higher than the VMS reference voltage 405. For example, knee reference 415 is 1.48V in one embodiment. $V_{KNEE}$ 425 approximately indicates the value of $V_{SENSE}$ 114 when output diode D6 stops conducting in each switching cycle of the power converter 100.

In one embodiment, $V_{VMS}$ 308 is included in the voltage feedback signals 218 received by the valley prediction module 214 (FIG. 2B). Valley prediction module 214 performs feature analysis, by examining the timing of the rising and falling edges of $V_{VMS}$ 308 to predict the times at which the valleys 328A, 328B . . . 328D of the voltage $V_{CE}$ 304 across switch 112 may occur before these valleys actually occur in the voltage $V_{CE}$ 304. For example, valley prediction module 214 can determine the resonant period 327 for $V_{CE}$ 304 and $V_{SENSE}$ 114 based on the timing data included in $V_{VMS}$ 308. As shown in FIG. 3, the midpoint of a trough for $V_{VMS}$ 308 approximately corresponds to a valley 328A, 328B . . . 328D and such midpoints are predictable via analysis of the edges of $V_{VMS}$ 308. Digital logic control block 204 generates a valley indicator pulse 310 synchronized to each valley 328A, 328B . . . 328D predicted by valley prediction module 214.

Valley prediction module 214 can also predict valleys 328A, 328B . . . 328D by analyzing $V_{KNEE}$ 425 along with $V_{VMS}$ 308. In one embodiment, the signals $V_{VMS}$ 308 and $V_{KNEE}$ 425 are included in the voltage feedback signals 218 received by the valley prediction module 214. The falling edge of $V_{KNEE}$ 425 occurring at time $t_{KNEE}$ 326A and the first falling edge of $V_{VMS}$ 308 within a single switching cycle represent two known time and voltage points for $V_{SENSE}$ 114. Since $V_{SENSE}$ 114 and $V_{CE}$ 304 are known to be decaying sinusoidal waveforms, valley prediction module 214 can utilize Fourier analysis techniques associated with decaying sinusoidal signals to characterize and predict the behavior of $V_{SENSE}$ 114. Due to the known and predictable relationship between $V_{SENSE}$ 114 and $V_{CE}$ 304, valley prediction module 214 can similarly characterize and predict the behavior of $V_{CE}$ 304, including the timing of valleys 328A, 328B . . . 328D. Digital logic control block 204 generates a valley pulse 310 synchronized to each valley 328A, 328B . . . 328D predicted by valley prediction module 214.

The valley detection and prediction operate in real time switching-cycle by switching-cycle of the switching power converter. Because the resonant characteristics of the power converter including the transformer magnetizing inductance and the parasitic capacitance can vary substantially among individual power supplies during mass production, and/or when the power converter is operating under different conditions, the real-time detection and prediction make the improved VMS scheme insensitive to the resonant characteristics variations during the power supply mass production and operations.

As described previously, FIGS. 3A and 3B are for illustrative purpose only. Although four valleys are shown in FIG. 3B, there can be more or fewer than four valleys before the switch is turned ON again at $t_{ON}$ 320B, and typically there are more valleys in light load conditions and fewer valleys in heavy load conditions. In some embodiments, the improved VMS scheme implemented by digital logic control block 204 can adapt to specific power converter operating conditions, such as a light output load. For example, a light load condition typically uses a PFM controls scheme and results in exceptionally long switching periods, causing $V_{CE}$ 304 and $V_{SENSE}$ 114 to decay to the point that the benefits of VMS switching are minimal. In one embodiment, digital logic control block 204 maintains a counter (not shown) to count the valleys 328A, 328B . . . 328D experienced during a switching period and, if the count exceeds a predetermined threshold, sets control signal 110 HIGH (turning on switch 112) at the desired switch time 330 rather than at the subsequent valley 328A, 328B . . . 328D. In another embodiment, digital logic control block 204 monitors durations of troughs on $V_{VMS}$ 308, and if a trough duration exceeds a threshold, sets control signal 110 HIGH (turning on switch 112) at the desired switch time 330 rather than at the subsequent valley 328A, 328B . . . 328D, as it is likely that $V_{SENSE}$ 114 has decayed such that it will not again exceed VMS reference 405 within the switching period. In another embodiment, valley prediction module 214 keeps generating valley indicator pulses even after $V_{SENSE}$ 114 has decayed to below VMS reference voltage 405, and so a valley hopping scheme may also be applied for conditions where longer switching periods occur.

Figure 5:
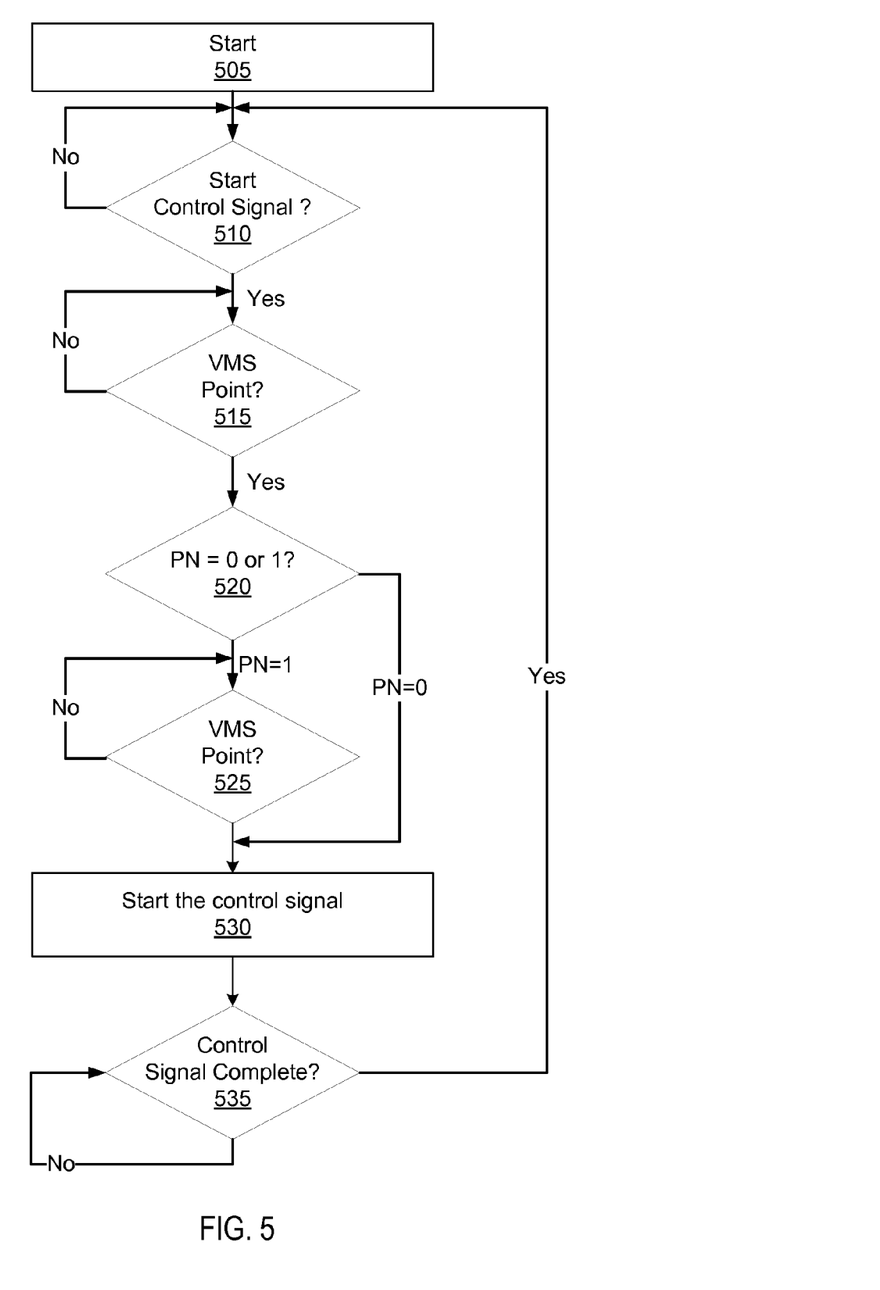
FIG. 5 illustrates a flowchart of an exemplary method for dithering the actual switching period of an AC to DC flyback switching power supply, according to one embodiment.

FIG. 5 illustrates a flowchart of an exemplary method for dithering the switching period of an AC to DC flyback switching power supply, according to one embodiment. The process of FIG. 5 may be carried out by controller 102 to implement the valley hopping scheme of the embodiments described herein. In step 505, the process starts and the switching control operation parameters, such as a desired switch time, pseudo-random bit sequence used to dither the valley switching points, and assignment of the valley switching points to an associated pseudo-random number may be determined. In step 510, a determination is made as to whether a control signal is to be generated to turn on switch 112. If a control signal is to be generated, indicating that the switch is to be turned on in the upcoming switching cycle of the power converter, the process proceeds to step 515. Otherwise, the process remains in step 510.

In step 515, controller 102 analyzes the output voltage (or $V_{SENSE}$) of the switching power converter 100 to determine if the output voltage is at a valley mode switching point that occurred subsequent to the desired switch time. If controller detects a valley point, the process proceeds to step 520, but otherwise the process remains in step 515 until the output voltage reaches a valley mode switching point. In step 520, controller 102 evaluates the output of a pseudo-random bit sequence 340 at the desired switch time calculated according to the output voltage regulation scheme to determine whether PN=0 or PN=1. If PN=0, which is assigned to the first valley point (328C) occurring subsequent to desired switch time calculated according to the output voltage regulation scheme in this example, controller 102 proceeds to start the control signal 110 and turns-on switch 112 at the first valley point 328C occurring subsequent to the desired turn-on time calculated according to the output voltage regulation scheme employed by controller 102 to start the new switching cycle in step 530. On the other hand, if PN=1 in step 520, which is assigned to the second valley point (328D) occurring subsequent to the desired switch time calculated according to the output voltage regulation scheme employed by controller 102, controller skips the first valley point (328C) and determines in step 525 whether the second valley point (328D) occurred. When the second valley point (328D) occurs, controller 102 proceeds to start the control signal 110 and turns-on switch 112 at the second valley point 328D to start the new switching cycle in step 530; otherwise, the controller 102 waits in step 525 until the second valley point (328D) occurs. Then, controller remains in step 535 until generation of the control signal 110 is complete, at which point the process returns to step 510 to start generation of control signal 110 in the next switching cycle of the power converter 100. In some embodiments, controller 102 may determine whether generation of control signal 110 is complete by detecting a falling edge of the control signal 110, which may indicate that switch 112 has been turned off and controller 112 should prepare for the start of a subsequent switching cycle.

Upon reading this disclosure, those of skill in the art will appreciate still additional alternative embodiments of an improved VMS scheme and associated implementation circuitry for switch-mode power converters through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

What is claimed is:

1. A switching power converter comprising:
a transformer including a primary winding coupled to an input voltage and a secondary winding coupled to an output of the switching power converter;
a switch coupled to the primary winding of the transformer, current in the primary winding being generated responsive to the switch being turned on and not being generated responsive to the switch being turned off; and
a controller coupled to the switch and configured to generate a control signal to turn on or turn off the switch, the switch being turned on responsive to the control signal being in a first state and the switch being turned off responsive to the control signal being in a second state, the controller being further configured to:
determine a desired turn-on time of the switch in each switching cycle according to a regulation mode employed by the switching power converter;
select one of a plurality of predicted local minimums of a voltage across the switch that are predicted to occur subsequent to the desired turn-on time, the selection being made based on a value of a selection signal; and
generate in said each switching cycle of the switching power converter the control signal in the first state to turn on the switch at an actual turn-on time corresponding to the selected one of the plurality of predicted local minimums of the voltage across the switch.

2. The switching power converter of claim 1, wherein the controller selects said one of said plurality of predicted local minimums of the voltage across the switch based on said value of said selection signal determined at the desired turn-on time.

3. The switching power converter of claim 1, wherein the controller is further configured to:
select in a first switching cycle a first one of the plurality of predicted local minimums of the voltage across the switch that are predicted to occur subsequent to the desired turn-on time, responsive to a first value of the selection signal; and
select in a second switching cycle a second one of the plurality of predicted local minimums of the voltage across the switch that are predicted to occur subsequent to the desired turn-on time and also subsequent to said first one of the plurality of predicted local minimums, responsive to a second value of the selection signal.

4. The switching power converter of claim 3, wherein:
said first one of the plurality of predicted local minimums of the voltage across the switch is the n'th predicted local minimum predicted to occur subsequent to the desired turn-on time, n being an natural number; and
said second one of the plurality of predicted local minimums of the voltage across the switch is the (n+1)'th predicted local minimum predicted to occur subsequent to the desired turn-on time.

5. The switching power converter of claim 3, wherein:
said first one of the plurality of predicted local minimums of the voltage across the switch is an n'th predicted local minimum predicted to occur subsequent to the desired turn-on time, n being a natural number; and
said second one of the plurality of predicted local minimums of the voltage across the switch is one of the predicted local minimums predicted to occur subsequent to the desired turn-on time and also subsequent to an (n+1)'th predicted local minimum.

6. The switching power converter of claim 1, wherein the value of the selection signal is generated based on a pseudo-random bit sequence.

7. The switching power converter of claim 1, wherein the value of the selection signal corresponds to a predetermined bit sequence.

8. The switching power converter of claim 1, wherein said one of the predicted local minimums of the voltage across the switch is a first local minimum voltage predicted to occur immediately subsequent to the desired turn-on time determined according to the regulation mode.

9. The switching power converter of claim 1, wherein the switch is a bipolar junction transistor and the voltage across the switch corresponds to a voltage between a collector and an emitter of the bipolar junction transistor.

10. The switching power converter of claim 1, wherein the switch is a metal oxide semiconductor field-effect transistor (MOSFET) and the voltage across the switch corresponds to a voltage between a drain and a source of the MOSFET.

11. The switching power converter of claim 1, wherein the controller determines the desired turn-on time of the switch in said each switching cycle according to the regulation mode employed by the switching power converter, independently of a transformer reset period or a resonant period of the voltage across the switch.

12. The switching power converter of claim 1, wherein the controller generates the control signal in the first state to turn on the switch at the desired turn-on time if the selection of said one of the plurality of predicted local minimums of the voltage across the switch is not made until a predetermined condition is met.

13. The switching power converter of claim 1, wherein the controller generates the control signal in the first state to turn on the switch at the desired turn-on time if a duration between two adjacent local minimums of the voltage across the switch exceeds a predetermined threshold.

14. A method of controlling a switching power converter, the switching power converter including a transformer with a primary winding coupled to an input voltage and a secondary winding coupled to an output of the switching power converter, and a switch coupled to the primary winding of the transformer, current in the primary winding being generated while the switch is turned on and not being generated while the switch is turned off, the method comprising:
determining a desired turn-on time of the switch in each switching cycle according to a regulation mode employed by the switching power converter;
calculating predicted timings at which a plurality of local minimums of a voltage across the switch are predicted to occur subsequent to the desired turn-on time, the predicted timings of the local minimums being calculated prior to actual occurrences of the local minimums;

selecting in said each switching cycle one of the plurality of predicted local minimums of the voltage across the switch based on a value of a selection signal;

generating in said each switching cycle a control signal in a first state to turn on the switch at an actual turn-on time corresponding to the selected one of the plurality of predicted local minimums of the voltage across the switch; and generating in said each switching cycle the control signal in a second state to turn off the switch according to the regulation mode.

15. The method of claim 14, wherein said one of a plurality of predicted local minimums of the voltage across the switch is selected based on the value of a selection signal determined at the desired turn-on time.

16. The method of claim 14, further comprising:
selecting in a first switching cycle a first one of the plurality of predicted local minimums of the voltage across the switch that are predicted to occur subsequent to the desired turn-on time, responsive to a first value of the selection signal; and
selecting in a second switching cycle a second one of the plurality of predicted local minimums of the voltage across the switch that are predicted to occur subsequent to the desired turn-on time and also subsequent to said first one of the plurality of predicted local minimums, responsive to a second value the selection signal.

17. The method of claim 16, wherein:
said first one of the plurality of predicted local minimums of the voltage across the switch is the n'th predicted local minimum predicted to occur subsequent to the desired turn-on time, n being an natural number; and
said second one of the plurality of predicted local minimums of the voltage across the switch is the (n+1)'th predicted local minimum predicted to occur subsequent to the desired turn-on time.

18. The method of claim 16, wherein:
said first one of the plurality of predicted local minimums of the voltage across the switch is an n'th predicted local minimum predicted to occur subsequent to the desired turn-on time, n being a natural number; and
said second one of the plurality of predicted local minimums of the voltage across the switch is one of the predicted local minimums predicted to occur subsequent to the desired turn-on time and also subsequent to an (n+1)'th predicted local minimum.

19. The method of claim 14, wherein the value of the selection signal is generated based on a pseudorandom bit sequence.

20. The method of claim 14, wherein the value of the selection signal corresponds to a predetermined bit sequence.

21. The method of claim 14, wherein said one of the predicted local minimums of the voltage across the switch is a first local minimum voltage predicted to occur immediately subsequent to the desired turn-on time determined according to the regulation mode.

22. The method of claim 14, wherein the switch is a bipolar junction transistor and a voltage across the switch corresponds to the voltage between a collector and an emitter of the bipolar junction transistor.

23. The method of claim 14, wherein the switch is a metal oxide semiconductor field-effect transistor (MOSFET) and the voltage across the switch corresponds to a voltage between a drain and a source of the MOSFET.

24. The method of claim 14, wherein the desired turn-on time of the switch is determined in each said switching cycle according to the regulation mode employed by the switching power converter, independently of a transformer reset period or a resonant period of the voltage across the switch.

25. The method of claim 14, further comprising:
generating the control signal in the first state to turn on the switch at the desired turn-on time if the selection of said one of the plurality of predicted local minimums of the voltage across the switch is not made until a predetermined condition is met.

26. The method of claim 14, further comprising:
generating the control signal in the first state to turn on the switch at the desired turn-on time if a duration between two adjacent local minimums of the voltage across the switch exceeds a predetermined threshold.

* * * * *